(12) United States Patent
Crompton

(10) Patent No.: US 8,210,576 B2
(45) Date of Patent: *Jul. 3, 2012

(54) PIPING JOINT ASSEMBLY, SYSTEM AND METHOD

(75) Inventor: David B. Crompton, Tiverton, RI (US)

(73) Assignee: Quick Fitting, Inc., East Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/981,855

(22) Filed: Dec. 30, 2010

(65) Prior Publication Data

US 2011/0095521 A1    Apr. 28, 2011

Related U.S. Application Data

(63) Continuation of application No. 11/807,072, filed on May 25, 2007, now Pat. No. 7,862,089.

(51) Int. Cl.
*F16L 19/06* (2006.01)
(52) U.S. Cl. .............................. 285/340; 285/39; 29/237
(58) Field of Classification Search .................. 285/340, 285/342, 343, 39; 29/890.14, 237
See application file for complete search history.

(56) References Cited

U.S. PATENT DOCUMENTS

| | | | | |
|---|---|---|---|---|
| 3,140,107 A | * | 7/1964 | Hynes | 285/340 |
| 3,679,241 A | * | 7/1972 | Hoffmann | 285/340 |
| 4,895,395 A | * | 1/1990 | Ceriani | 285/39 |
| 6,824,172 B1 | * | 11/2004 | Komolrochanaporn | 285/340 |
| 7,195,287 B2 | * | 3/2007 | Wai | 285/340 |
| 7,862,089 B2 | * | 1/2011 | Crompton | 285/340 |

FOREIGN PATENT DOCUMENTS

DE    4304241    *    8/1994

* cited by examiner

*Primary Examiner* — David E Bochna
(74) *Attorney, Agent, or Firm* — Williams Mullen PC; Thomas F. Bergert

(57) ABSTRACT

A piping joint assembly and fastening ring removal tool allow re-use and repair of push-fit piping fittings and valves without damage to the fitting or valve elements or the pipe. The quick connection pipe fitting assembly package of the present invention employs a threaded retaining cap that when removed, exposes the clamping, sealing and fastening mechanism of the fitting or valve. In one embodiment, the present invention further includes a removable packing gland mounted on a body about an axis of an orifice. The present invention facilitates re-use of existing fittings and valves by allowing the internal components to be removed, repaired and/or replaced.

15 Claims, 5 Drawing Sheets

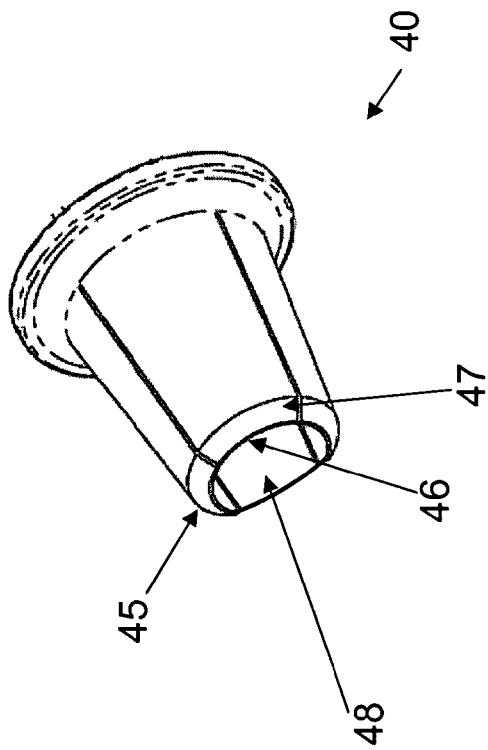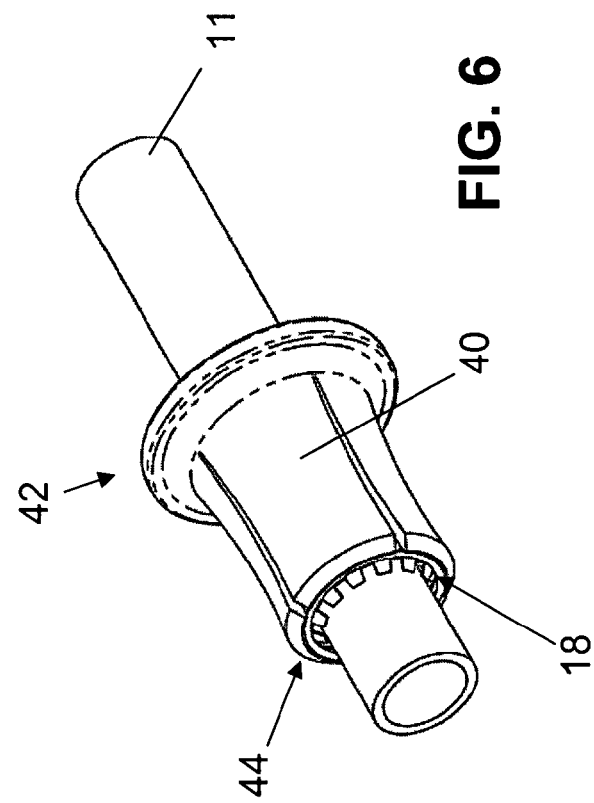

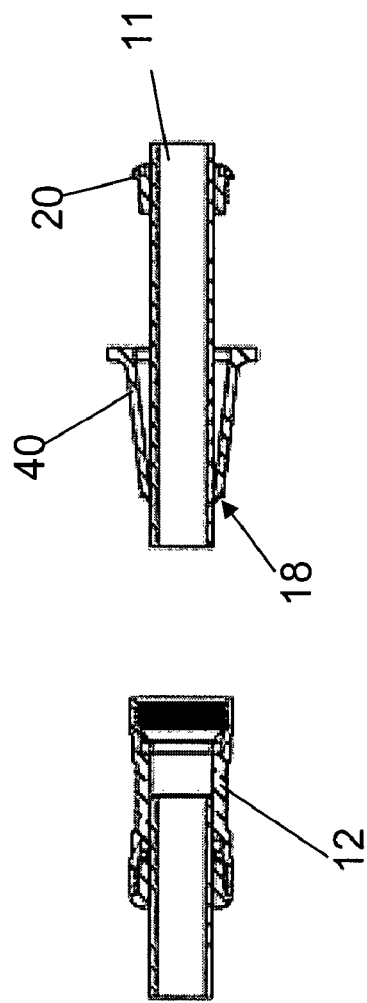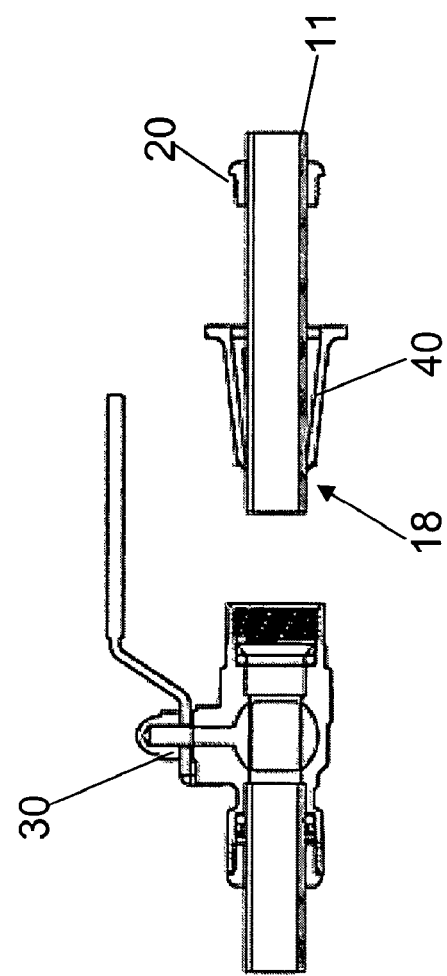

PIPING JOINT ASSEMBLY, SYSTEM AND METHOD

REFERENCE TO RELATED APPLICATIONS

The present invention is a continuation of U.S. application Ser. No. 11/807,072, now U.S. Pat. No. 7,862,089, entitled "Piping Joint Assembly System and Method" filed on May 25, 2007.

FIELD OF THE INVENTION

The present invention relates to fluid flow systems, and more particularly to a push-fit piping joint assembly, system and method that facilitates the repair and re-use of piping system parts.

BACKGROUND OF THE PRESENT INVENTION

Piping systems exist to facilitate the flow of fluids (e.g., liquid, gas (such as air) or plasma). For example, homes, schools, medical facilities, commercial buildings and other occupied structures generally require integrated piping systems so that water and/or other fluids can be circulated for a variety of uses. Liquids and/or gases such as cold and hot water, breathable air, glycol, compressed air, inert gases, cleaning chemicals, waste water, plant cooling water and paint and coatings are just some examples of the types of fluids and gases that can be deployed through piping systems. Tubing/piping types can include, for example, copper, stainless steel, CPVC (chlorinated polyvinyl chloride) and PEX (cross-linked polyethylene).

Piping connections are necessary to join various pieces of pipe and must be versatile in order to adapt to changes of pipe direction required in particular piping system implementations. For example, fittings and valves may be employed at the ends of open pieces of pipe that enable two pieces of pipe to fit together in a particular configuration. Among fitting types, there are elbows, "tees", straight couplings adapted for various purposes such as pipe size changes, ends, ball valves, stop valves, and partial angle connectors, for example.

In the past, pipe elements have been traditionally connected by welding and/or soldering them together using a torch. Soldering pipe fittings can be time-consuming, unsafe, and labor intensive. Soldering also requires employing numerous materials, such as copper pipes and fittings, emery cloths or pipe-cleaning brushes, flux, silver solder, a soldering torch and striker, a tubing cutter and safety glasses. The process for soldering pipes can proceed by first preparing the pipe to be soldered, as the copper surface must be clean in order to form a good joint. The end of the pipe can be cleaned on the outside with emery cloth or a specially made wire brush. The inside of the fitting must be cleaned as well. Next, flux (a type of paste) can be applied to remove oxides and draw molten solder into the joint where the surfaces will be joined. The brush can be used to coat the inside of the fitting and the outside of the pipe with the flux. Next, the two pipes are pushed together firmly into place so that they "bottom out"—i.e., meet flush inside the fitting. The tip of the solder can be bent to the size of the pipe in order to avoid over-soldering. With the pipes and fitting in place, the torch is then ignited with the striker or by an auto-strike mechanism to initiate soldering. After heating for a few moments, if the copper surface is hot enough such that it melts when touched by the end of the solder, the solder can then be applied to the joint seam so that it runs around the joint and bonds the pipe and fitting together.

In recent years, push-fit technology has been employed with piping systems to reduce the dangers and time involved in soldering joints. Push-fit methods require minimal knowledge of pipe fitting and involve far fewer materials than soldering. For example, one may only need the pipes, quick-connect fittings, a chamfer/de-burring tool and tubing cutter in order to connect pipes using push-fit technology.

The steps involved in connecting piping systems using push-fit technology can be outlined as follows. First, the pipe is cut to the appropriate length and the end of the pipe is cleaned with the de-burring tool. Then the pipe and fitting are pushed together for connection. The fitting is provided with a fastening ring (also called a collet, grip ring or grab ring) having teeth that grip the pipe as it is inserted. The fastening ring device is employed to provide opposing energy, preventing the device from disconnection and creating a positive seal. Accordingly, no wrenches, clamping, gluing or soldering is involved. Push-fit and/or quick-connect technology for piping systems can be obtained, for example, through Titan Supply Company of Tiverton, R.I., USA, suppliers of the CoPro® line of pipe fittings and related products.

Past pipe fittings and connection methods do not allow repair for various reasons. In some cases, this is because they are factory sealed, for example. In other cases, it is because the separation of the fitting from the pipe can damage or induce wear on the parts. For example, some push-fit pipe fittings provide permanently fixed demounting rings for removing the fittings. The demounting rings can be depressed axially to lift the fastening ring teeth off of the surface of the inserted pipe, such that the pipe can then be withdrawn. This arrangement can subject the pipe fittings to tampering and shorter life, however. In addition, while fastening ring devices work effectively as an opposing retaining, their functionality makes them nearly impossible to dismount, remove or detach for re-use. The fastening rings are thus permanently affixed unless they are cut and removed, which then destroys the fastening ring.

Whether connected by traditional soldering methods or with push-fit methods, past efforts have been specifically provided for the connection of like materials and lack the ability to connect two unlike materials, such as copper with CPVC, PEX or stainless steel, or any other combination of unlike materials. Past methods further invariably require the replacement of fittings and valves, and do not allow re-use of the fittings or valves in instances where only a small internal component needs to be repaired or replaced.

SUMMARY OF THE PRESENT INVENTION

The present invention provides, in part, a pipe fitting assembly package as well as a removal tool allowing one to re-use push-fit piping fittings without damage to the fitting elements or the pipe. The present invention connects tubing/piping using no tools, clamps, solder or glues, while creating a leak-free seal at the connected joining area. Further, unlike prior methods, the present invention can join both like and unlike piping elements in any combination.

The quick connection pipe joint assembly package provided as part of the present invention employs a threaded retaining cap that when removed, exposes the clamping, sealing and fastening mechanism of the fitting or valve. This is required to enable the removal of the fitting or valve, exposing the fastening ring. The end cap (also referred to as a gland nut or packing nut) moves axially and transforms rotational movement into translational movement of the sealing parts (i.e.; packing arrangement) of the present invention. A packing gland, which has an equal slope to the pitch of the fastening ring, supports the fastening ring and has an opposing surface that applies even pressure across the surface of a ring gasket. In one embodiment, a split washer member is employed to assist in the assembly and disassembly of the packing arrangement.

The removal device provided as part of the present invention is primarily employed for the removal and re-use of quick connection fastening rings used in the connection of tubing, piping and other cylindrical objects. The fastening ring removal device is manually pushed onto the cylindrical object and expands to traverse over the installed fastening ring. Once the fastening ring removal device has passed over the fastening ring, the device reforms itself to the outside diameter of the cylindrical object. The fastening ring removal device is then forced in the direction of the fastening ring and, with a parallel angular surface, lifts the fastening ring from the cylindrical surface, allowing the fastening ring to be pushed to the open end of the cylindrical object. In one embodiment of the present invention, the removal device has a plurality of cut areas or slits extending axially along its surface to allow for the expansion of the upper rim portion of the fastener removal tool as it slides over a remaining fastening ring.

BRIEF DESCRIPTION OF THE DRAWINGS

FIG. 5 is a front perspective view of one embodiment of the removal tool of the present invention.

FIG. 6 is a front perspective view of one embodiment of the removal tool of the present invention, in position behind a fastening ring member, both of which are in position around a pipe element.

FIGS. 7 and 8 are exploded front cross-sectional views of various embodiments of piping assembly packages as provided in accordance with the present invention.

DETAILED DESCRIPTION OF THE PREFERRED EMBODIMENTS

Figure 1:
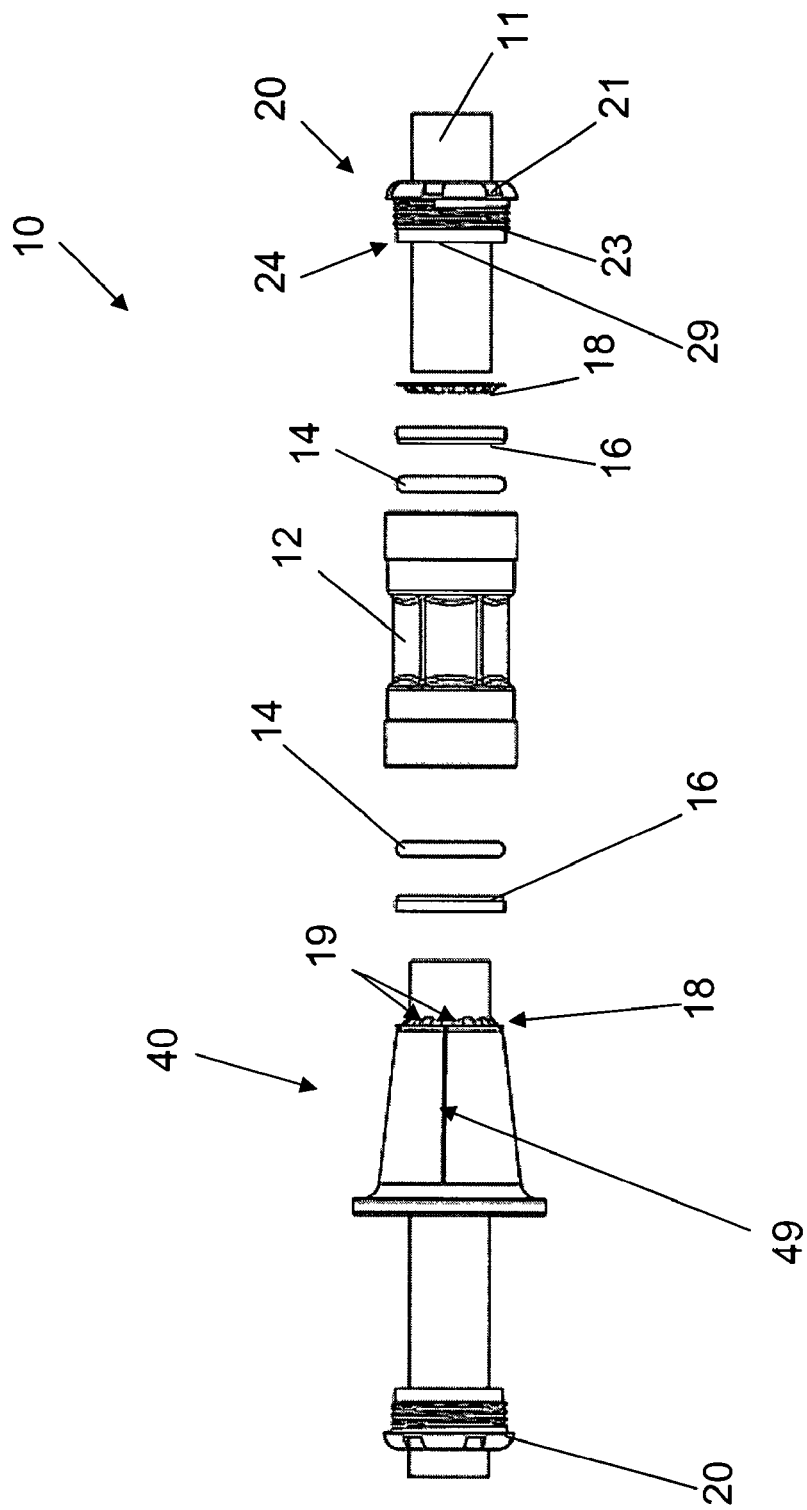
FIG. 1 is an exploded front elevation of the removal tool as part of the piping assembly package of the present invention.

In the push-fit piping joint assembly 10 of the present invention as shown in FIG. 1, elements of the joint assembly as shown include: a fitting body 12 with interior threads, a male packing gland 16, a fastening ring 18, an O-ring member 14 (Which can be optionally lubricated) and a retaining cap 20 (also referred to as a gland nut or packing nut) with exterior threads 23 to mate with the threads on the fitting body 12. The packing gland, fastening ring and O-ring member together provide one embodiment of a packing arrangement for the present invention, and each has an internal diameter that allows for smooth and snug engagement of a piping or tubing element external surface. In one embodiment of the present invention, the interior diameter of the packing gland, fastening ring and O-ring member are substantially the same as the interior diameter of the end cap body member portion 24. The end cap body member portion 24 is substantially cylindrical and includes the threads 23 on the exterior surface as well as a contact edge 29 at the pipe or valve fitting mating end thereof.

In one embodiment of the present invention, the fitting body can be forged CW617N brass, with full porting and full flow fitting, for example. The packing gland 16 can be made of a polyamide material, and the lubricant for the O-ring 14 can be a food grade lubricant, for example. It will be appreciated that the O-ring can comprise a flat ring or washer-type seal member in addition or as an alternative to a circular member of substantially circular cross-section. The fastening ring 18 can be stainless steel, and the fastening ring is capable of grabbing the pipe's surface via two or more teeth 19 to ensure connections cannot be pulled apart. The fastening ring teeth are angled downward from the perimeter of the ring, toward the fitting and away from the cap, such that when the pipe is inserted, the teeth exert a pressure against the pipe to discourage the pipe from slipping or moving back out of the fitting. The male packing gland quickly and easily creates a sealing surface. No wrenches, solder, welding, glue and/or twisting and turning the elements are required to form a connection. The threaded retaining cap 20 includes a top cap portion 21 that, when screwed into the fitting body, provides a positive pressure against the male packing gland 16, which in turn provides sealing energy to the O-ring seal 14. The threaded retaining cap affords a more rigid connection than plastic type fittings and can be removed to disassemble the fitting. During removal, a tool such as a specially adapted wrench, for example, can be applied to the outer top surface of the end cap member so as to exert a rotational force that causes the end cap member to loosen its threaded connection with the piping or valve element. Once unthreaded, the end cap member then exposes the internal components (e.g., O-ring, packing gland, fastening ring) for removal and/or replacement.

Figure 2:
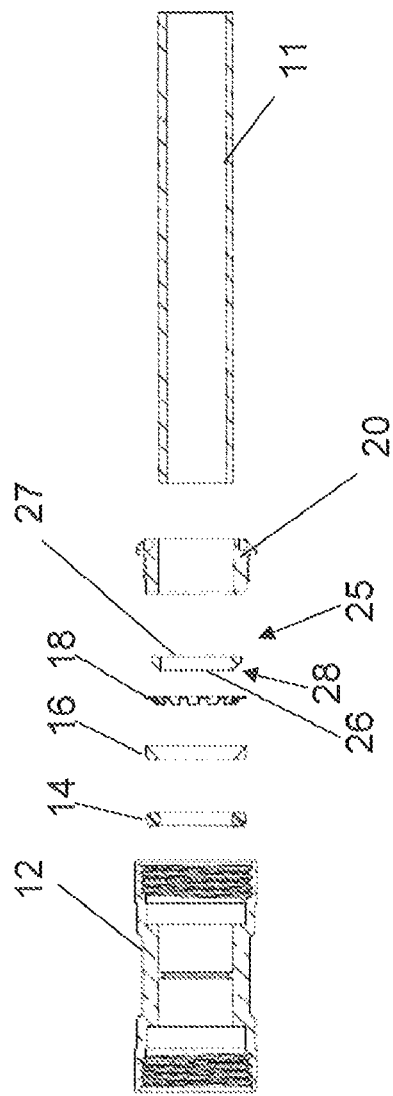
FIGS. 2 and 3 are exploded front cross-sectional views of a sample implementation of the removal tool of the present invention in various application environments.
Figure 3:
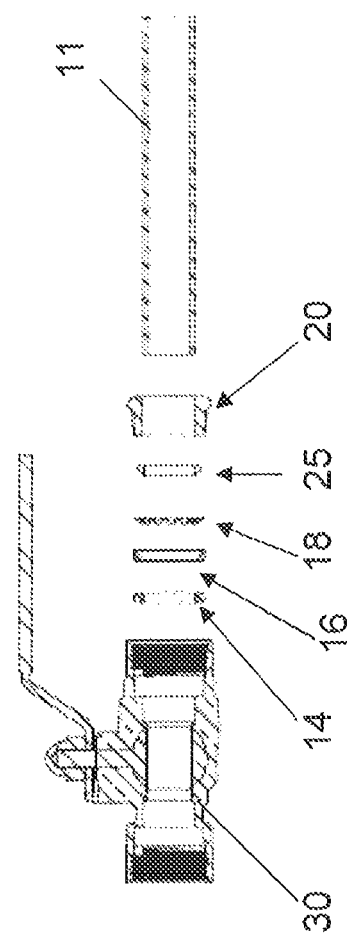

In one embodiment of the present invention, as shown in FIGS. 1 through 3, the end cap 20 is a removable threaded gland nut mounted on the pipe. As the gland nut is threaded into the fitting or valve, even pressure is applied at the cap edge 29 to the sealing or packing arrangement assembly, creating mechanical force on the O-ring to compress the O-ring evenly. Once compressed, the O-ring increases its sealing surface along the tubing/pipe member, thereby increasing the amount of pressure exerted by the O-ring to the sealed surface. The packing gland supports the fastening ring 18 and has an opposing surface that applies even pressure across the surface of the ring gasket or O-ring member 18, FIG. 3 shows an arrangement of the present invention wherein a ball valve 30 is employed instead of fitting member 12.

As shown in FIGS. 2 and 3, the present invention can further include a washer member 25 between the cap 20 and the fastening ring 18. The washer member 25 includes a cap-engaging portion 26 and a fastening ring-engaging portion 27. The cap-engaging portion 26 is of greater diameter than the fastening ring-engaging portion 27 in one embodiment of the present invention, thereby forming a frusto-conical shape with an angled outer surface 28 for mating with the fastening ring teeth. In one embodiment of the present invention, the washer member 25 is a split ring washer having a gap to facilitate physical adjustments involved in positioning the washer member around the pipe for assembly and removal.

Figure 4:
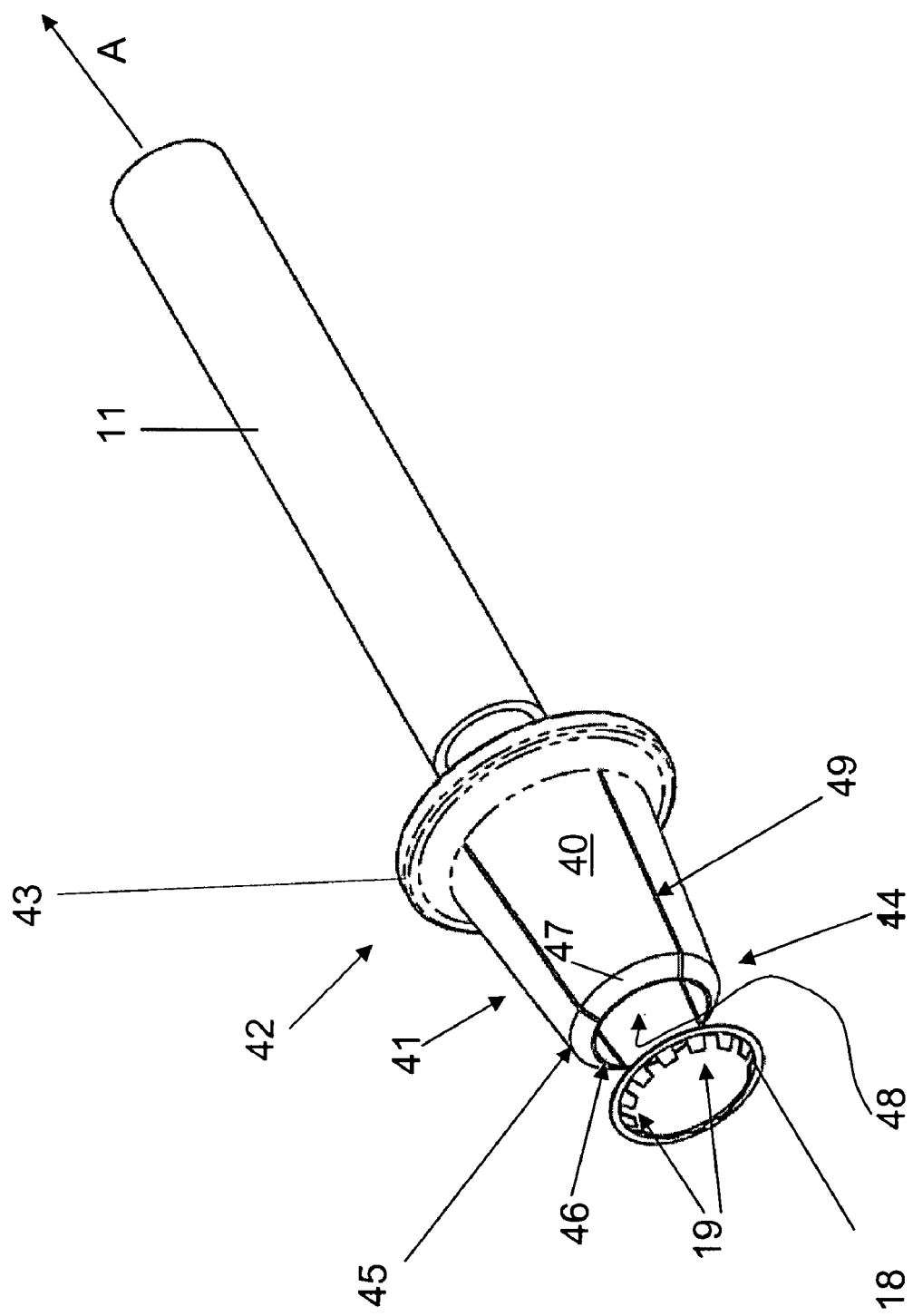
FIG. 4 is a front perspective view of the removal tool of the present invention, along with a fastening ring member and pipe element.

As shown in FIGS. 4 and 5, the removal tool 40 provided as part of the present invention can be used to remove fastening rings safely and effectively for re-use and repair of piping system parts. In one embodiment of the present invention, the tool 40 comprises a generally frusta-conically shaped hollow body 41 having a base portion 42 and a top rim portion 44, with a lower base outer platform 43 extending outwardly from the base, and with the rim portion 44 being angled upwardly from a lateral edge 45 to a peak 46, such that the peak defines the circumference of a substantially circular opening 48 that extends through the body to make it hollow. The area from the edge to the peak is a rim pushing surface 47 for mating with the fastening ring 18 (or washer member 25 in one embodiment of the present invention). The rim pushing surface 47 extends at an angle to the axis A of the pipe that is substantially identical to the angle of the fastener ring teeth 19.

In one embodiment of the present invention, the removal tool 40 has a plurality of slits or cut areas 49 extending axially therealong to allow for the expansion of the size of the fastener removal tool as it slides over a remaining fastening ring. Once over the fastening ring, the dismountable connection device clamps to the surface of the cylindrical object. In this way, it will be appreciated that only one removal tool is required for all sizes of pipes and clips. When pressure is applied against the fastening ring using the removal tool, the pushing surface 47 lifts the fastening ring from the surface of the cylinder. In one embodiment of the present invention, the cap can be used to apply pressure to the removal tool.

Operation of the Removal Tool

In operation of one embodiment of the removal tool of the present invention, as shown in FIGS. 6-8, the fastening ring removal device 40 is manually pushed onto the cylindrical object, and expands to traverse over the installed fastening ring 18. Once the fastening ring removal device has passed over the fastening ring, the device reforms itself to the outside surface of the cylindrical object 11. The fastening ring removal device 40 is then forced in the direction of the fastening ring with a parallel angular surface 47 that lifts the fastening ring from the cylindrical surface, allowing the fastening ring to be pushed to the open end of the cylindrical object 11. Unscrewing the threaded retaining cap 20 exposes the clamping, sealing and fastening mechanism of the fitting 12 (FIG. 7) or valve 30 (FIG. 8). This is required to enable the removal of the fitting or valve, exposing the fastening ring.

As continual pressure is applied to the pushing surface of the device, the guiding unit guides the pusher along the axis, applying pressure against the fastening ring prongs so as to remove the fastening ring from the cylinder. The removal device is then removed from the surface to allow for reuse of the quick connection fitting and cylinder.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

What is claimed and desired to be secured by Letters Patent is:

1. A piping joint assembly package for securely and removably maintaining piping elements together, comprising:
  a body member having at least one pipe receiving end, said body member being at least partially hollow and internally threaded at the pipe receiving end;
  a hollow end cap member having a cap portion and a substantially cylindrical body portion extending from the cap portion to a contact edge, the body portion being externally threaded;
  a packing arrangement secured between the body member and the end cap, the packing arrangement including a hallow O-ring, a hollow packing gland, and a hollow fastening ring having a plurality of teeth angled inwardly from and along the circumference of the ring; and
  a fastening ring member removal tool comprising a generally frusto-conically shaped hollow body having a base portion and a top rim portion, said body having a lower base outer platform extending outwardly from the base, said rim portion being angled upwardly from a lateral edge to a peak, such that the peak defines the circumference of a substantially circular opening that extends through the body to make the body hollow.

2. The package of claim 1 wherein the packing arrangement further includes a washer member that is substantially frusto-conical in shape with a cap-engaging surface and a fastener ring-engaging surface, with the cap-engaging surface being of larger diameter than the fastener ring-engaging surface.

3. The package of claim 2 wherein the washer member is a split ring washer.

4. The package of claim 1 wherein the end cap member can be used to apply force to the removal tool.

5. The package of claim 1 wherein the packing arrangement can be removed from the body member, and a portion of the packing arrangement can be replaced or repaired, such that the body member can be re-used when the packing arrangement is re-assembled with the body member and end cap member.

6. The package of claim 1 wherein the end cap member cap portion includes an outer top surface adapted for engagement by external force so as to exert a rotational force that causes the end cap member to tighten or loosen its threaded connection with the body member.

7. A method for assembling a pipe joint assembly so as to facilitate re-use of a fitting or valve body member, comprising the steps of:
  providing a body member having at least one pipe receiving end, said body member being at least partially hollow and internally threaded at the pipe receiving end;
  providing a hollow end cap member having a cap portion and a substantially cylindrical body portion extending from the cap portion to a contact edge, the body portion being externally threaded;
  providing a packing arrangement secured between the body member and the end cap, the packing arrangement including a hollow O-ring, a hollow packing gland, and a hollow fastening ring having a plurality of teeth angled inwardly from and along the circumference of the ring; and,
  providing a fastening ring member removal tool comprising a generally frusto-conically shaped hollow body having a base portion and a top rim portion, with the body having a lower base outer platform extending outwardly from the base, and with the rim portion being angled upwardly from a lateral edge to a peak, such that the peak defines the circumference of a substantially circular opening that extends through the body to make the body hollow.

8. The method of claim 7 wherein the packing arrangement is provided such that one or more of the fastening ring, packing gland, and O-ring can be removed when the end cap member is unscrewed from the body member.

9. The method of claim 7 wherein the packing arrangement includes a washer member comprising a split ring washer.

10. The method of claim 9 wherein the washer member is substantially frusto-conical in shape with a cap-engaging surface and a fastener ring-engaging surface, with the cap-engaging surface being of larger diameter than the fastener ring-engaging surface.

11. The method of claim 7 wherein the end cap member cap portion includes an outer top surface adapted for engagement by external force so as to exert a rotational force that causes the end cap member to tighten or loosen its threaded connection with the body member.

12. A piping joint assembly, comprising:
- a body member for receiving a piping element;
- a hollow end cap member capable of engaging the body member;
- a packing arrangement secured between the body member and the end cap member, the packing arrangement including a hollow O-ring, a hollow packing gland, and a hollow fastening ring having a plurality of teeth angled inwardly from and along the circumference of the ring; and
- a fastening ring member removal tool comprising a generally frusto-conically shaped hollow body having a base portion and a top rim portion, said body having a lower base outer platform extending outwardly from the base, said rim portion being angled upwardly from a lateral edge to a peak, such that the peak defines the circumference of a substantially circular opening that extends through the body to make the body hollow.

13. The piping joint assembly of claim 12 wherein the packing arrangement includes a washer member comprising a split ring washer.

14. The piping joint assembly of claim 13 wherein the washer member is substantially frusto-conical in shape.

15. The piping joint assembly of claim 13 wherein the washer member includes a cap-engaging surface and a fastener ring-engaging surface, with the cap-engaging surface being of larger diameter than the fastener ring-engaging surface.

* * * * *